United States Patent
Li et al.

(10) Patent No.: US 6,556,006 B1
(45) Date of Patent: Apr. 29, 2003

(54) METHOD FOR MAGNETO-RESISTIVE HEAD ELECTROSTATIC POPPING DETECTION

(75) Inventors: Zhaohui Li, Santa Clara, CA (US); Andrew Kao, Freemont, CA (US); Keung Youn Cho, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/990,631

(22) Filed: Nov. 21, 2001

(51) Int. Cl.$^7$ ............................................... G01R 33/12
(52) U.S. Cl. ......................................... 324/210; 360/31
(58) Field of Search ............................ 324/210, 211, 324/212; 369/53.1, 53.38; 360/31

(56) References Cited

U.S. PATENT DOCUMENTS

| | | |
|---|---|---|
| 4,958,337 A | 9/1990 | Yamanaka et al. |
| 5,055,969 A | 10/1991 | Putnam |
| 5,422,764 A | 6/1995 | McIlvanie |
| 5,442,638 A | 8/1995 | Awad et al. |
| 5,499,161 A | 3/1996 | Hosseinzadeh et al. |
| 5,583,720 A | 12/1996 | Ishida et al. |
| 5,610,776 A | 3/1997 | Oh |
| 5,737,837 A | 4/1998 | Inaba |
| 5,754,353 A | 5/1998 | Behrens et al. |
| 5,757,582 A | 5/1998 | White et al. |
| 5,760,982 A | 6/1998 | Stein |
| 5,822,139 A | 10/1998 | Ayabe |
| 5,844,911 A | 12/1998 | Schadegg et al. |
| 5,914,594 A | 6/1999 | Mian |
| 6,078,473 A | 6/2000 | Crane et al. |
| 6,151,180 A | 11/2000 | Bang |
| 6,326,553 B1 | 12/2001 | Yim et al. |

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| GB | 2 326 755 A | 12/1998 |
| WO | WO 93/10494 | 5/1993 |

*Primary Examiner*—Walter E. Snow
(74) *Attorney, Agent, or Firm*—Irell & Manella, LLP; Jeffrey P. Aiello

(57) ABSTRACT

A method and system for detecting electrostatic noise in a magneto-resistive head which may be caused by a plurality of conditions manifesting in the frequency domain as either an amplitude spike or an unstable baseline. In one embodiment, the signals generated by the head when reading a DC-erased track are compared. When viewed in the frequency domain the spectrum gap between the signals is used to determine if the head being tested suffers from defects causing an unstable baseline or from defects causing an amplitude spike.

64 Claims, 8 Drawing Sheets

UNSTABLE BASELINE HEAD

AMPLITUDE SPIKE HEAD

METHOD FOR MAGNETO-RESISTIVE HEAD ELECTROSTATIC POPPING DETECTION

BACKGROUND

1. Field

The inventor's disclosure generally relates to disk drives and more particularly to a method and system for detecting electrostatic noise of magneto-resistive heads in hard disk drive assemblies.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

Dual element transducers are increasingly utilized in hard disk drives because they are lighter than single element transducers. Dual element transducers include a single write element and a separate read element which is constructed from a magneto-resistive material. Such dual element transducers are commonly referred to as magneto-resistive ("MR") heads and the read elements of such heads are often referred to as GMR/MR sensors. More recently, heads have been constructed using alternating magnetic and nonmagnetic films thereby drastically increasing their resistivity. Such heads are generally known as giant magneto-resistive ("GMR") heads.

Along with the desire to improve head design, there is also a desire to decrease the failure rate of the hard disk drives. While such failures occur for a variety of reasons, one cause is GMR/MR head instability, particularly head instability associated with electrostatic discharge. Such electrostatic discharge manifests as popping noise and may similarly be caused by a variety of conditions, such as junction permanent-magnet insufficiency or dielectric breakdown of the insulting layer between the conducting sensor stripes.

One problem with detecting popping noise in a GMR/MR head is that different causes of popping noise manifest as different types of popping noise. For example, popping noise manifested as amplitude spikes may be caused by GMR/MR internal design flaws, while popping noise manifested as an unstable baseline not correlated to a signal may be caused by dielectric breakdown. Finally, heads which exhibit unstable baselines correlated to a signal may be caused by junction-induced instability.

One problem in the art is that it is difficult to detect these different types of popping noise using a single simple method. Thus, there is a need in the art for a single improved method that is capable of detecting different types of popping noise.

BRIEF SUMMARY

The inventor discloses a method and system for detecting defective heads. In one embodiment, the method comprising erasing a track on a disk, said disk including a plurality of tracks, reading said track with a head, determining a first signal amplitude at a first frequency using a first current supplied to said head, and determining a second signal amplitude at said first frequency using a second current supplied to said head. The method further comprises determining a first noise measure, said first noise measure to be a function of said first signal amplitude and said second signal amplitude, and identifying said head as having a first defect type where said first noise measure is greater than a first amplitude threshold.

DETAILED DESCRIPTION

The inventor discloses a method and system for detecting popping noise caused by electrostatic discharge across a GMR/MR head. One embodiment is to detect GMR/MR head popping noise manifesting as an amplitude spike. In this embodiment, a two-spot test method is used wherein the noise generated at a given spot frequency for a first current level is compared to the noise generated at the same spot frequency at a second current level. Thereafter, the result of this comparison may be used to determine whether or not the head being tested (hereinafter the "Test Head") suffers from an amplitude spike defect. Another embodiment is to detect GMR/MR popping noise manifested as an unstable baseline in the frequency domain which is not correlated to a signal. Again, a two-spot method is used wherein the noise generated at a given spot frequency for a first current level is compared to the noise generated at the same spot frequency at a second current. As with the previous embodiment, the result of this comparison is used to determine whether a head suffers from an unstable baseline defect. In yet another embodiment, heads having either amplitude spike or unstable baseline defects are detected using a single two-spot frequency method.

Figure 1A:
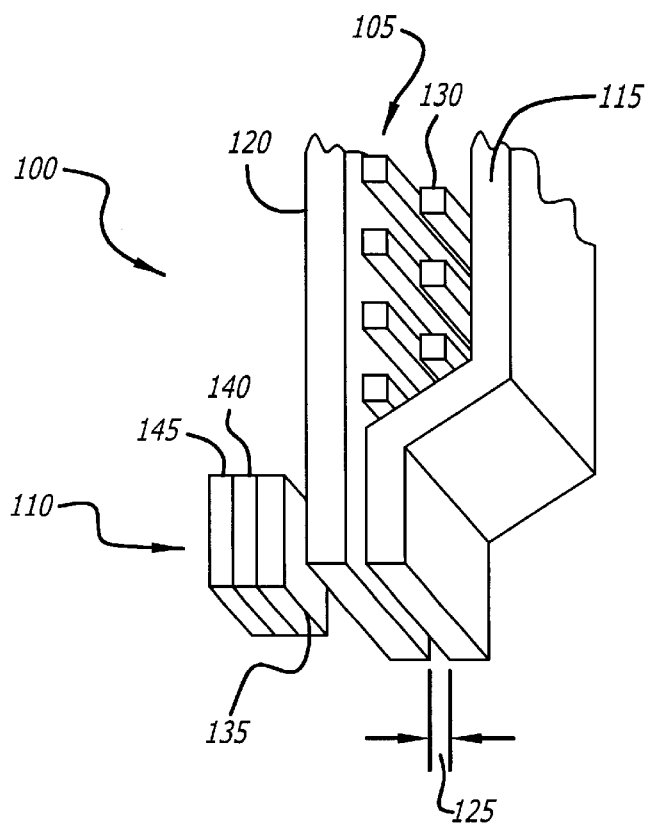
FIG. 1A is a perspective view of a read/write MR head according to one embodiment.

Referring to the drawings more particularly by reference numbers, FIG. 1 illustrates an MR read/write head 100. In particular, the head is comprises of an inductive head 105 and a GMR/MR sensor 110. The function of the inductive head 105 is to write data to a disk, while the function of the GMR/MR sensor 110 is to read signals from a magnetized surface, such as the surface of a hard disk in a hard disk drive. The inductive head 105 consists of a top pole 115 and a bottom pole 120. The poles, separated by some gap 125, are magnetized by passing a current through the coils 130. The resulting magnetic field across the gap 125 is capable of magnetizing the surface of a disk when passed sufficiently close to a disk's surface, thus enabling digitized data to be written to a disk.

The GMR/MR sensor 110 is typically positioned near the bottom pole 120 of the inductive head 105 and is typically narrower than the inductive head 105. Furthermore, the layer nearest the inductive head 105 may be a laminate of a bias magnetic film 135. Thereafter, an insulting layer 140 and a magneto-resistive layer 145 may follow.

Figure 1B:
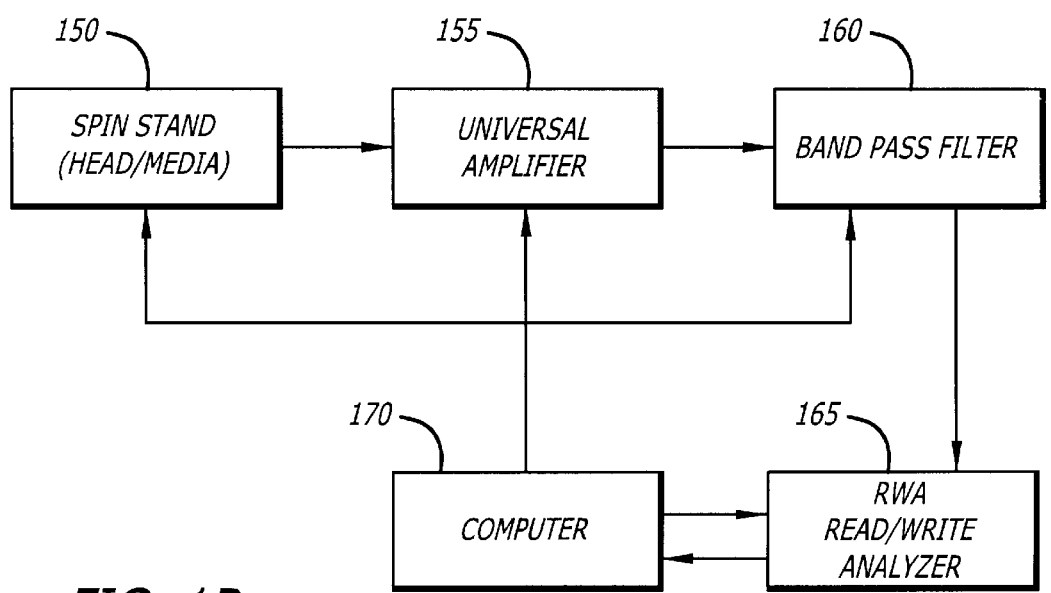
FIG. 1B is an exemplary block diagram of a system for testing a GMR/MR head, according to one embodiment.

FIG. 1B is an exemplary block diagram of a head test system. Spin stand 150 contains the Test Head and the media to be used in conjunction with the Test Head. While in one embodiment spin stand 150 is a Guzik Micro Positioning Spinstand, it should be appreciated that any device, including a traditional disk drive assembly, which is capable of passing a GMR/MR head over the surface of a magetizable media while supplying a current to the head may be used. Moreover, it should be appreciated that a plurality of Test Heads may be simultaneously located and tested at spin stand 150.

Once the Test Head at spin stand 150 generates a signal, the signal may then be passed to a universal amplifier 155 which amplifies the signal. Thereafter, an over-write filter 160, such as a controllable band pass filter, may be used to narrow the range of frequencies which are to be passed to the read/write analyzer ("RWA") 165. In one embodiment, the over-write filter 160 is set to pass a 100 kilohertz band centered on 3 megahertz. It is to be appreciated that the over-write filter 160 may be set to pass any frequency range.

In one embodiment, the RWA 165 is a Guzik RWA analyzer. However, any analyzer which converts the head signal from an analog to a digital form and which supports frequency domain analysis may be used. Once the head signal is analyzed at 165, computer 170 may be used to store and/or display the results. Computer 170 may include a processor or central processing unit (CPU). The CPU may, in turn, include an Arithmetic Logic Unit (ALU) for performing computations, a collection of registers for temporary storage of data and instructions, and a control unit for controlling operation of the computer 170. The CPU may be a microprocessor as is commonly known in the art, or may take on other forms such as microcontrollers, digital signal processors, reduced instruction set computers (RISC), application specific circuits, and the like. The computer 170 may also include system memory (RAM), input/output (I/O) devices, and a mass storage device. The mass storage device may include a hard disk, floppy disk, CD-ROM, DVD-ROM, tape, high capacity removable media, solid state memory device, etc. The computer may further include system firmware such as system BIOS, ROM and flash memory.

Moreover, computer 170 should include at least one application program capable of controlling spin stand 150 and the current to be supplied to the Test Head. Computer 170 may also be configured to run software which automates the process of adjusting the current supplied to the Test Head, the frequency to be passed to the RWA 165, and the specifics of what read/write operations to have the Test Head perform.

Figure 2B:
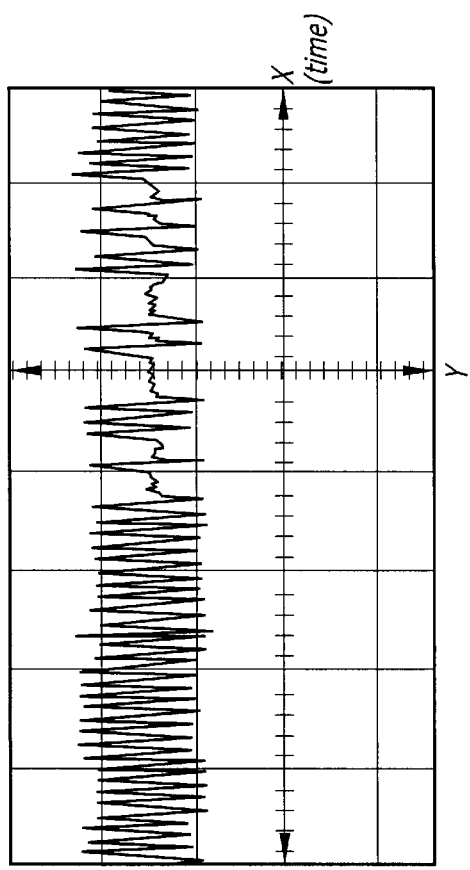
FIG. 2B depicts a time-domain noise plot of a head exhibiting an unstable baseline defect.
Figure 2A:
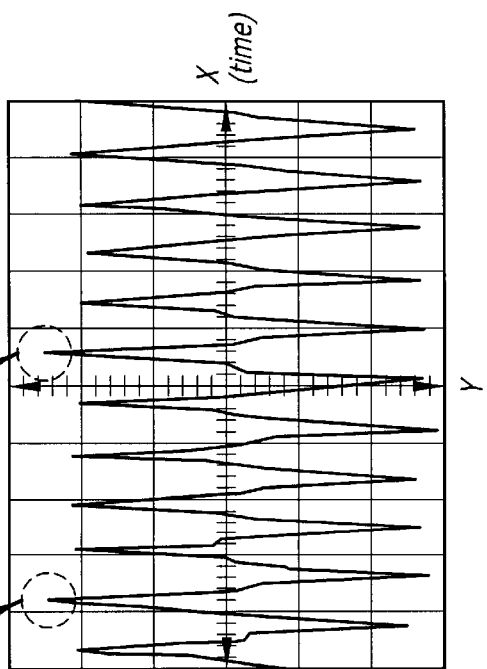
FIG. 2A depicts a time-domain noise plot of a head exhibiting an amplitude spike defect.
Figure 2C:
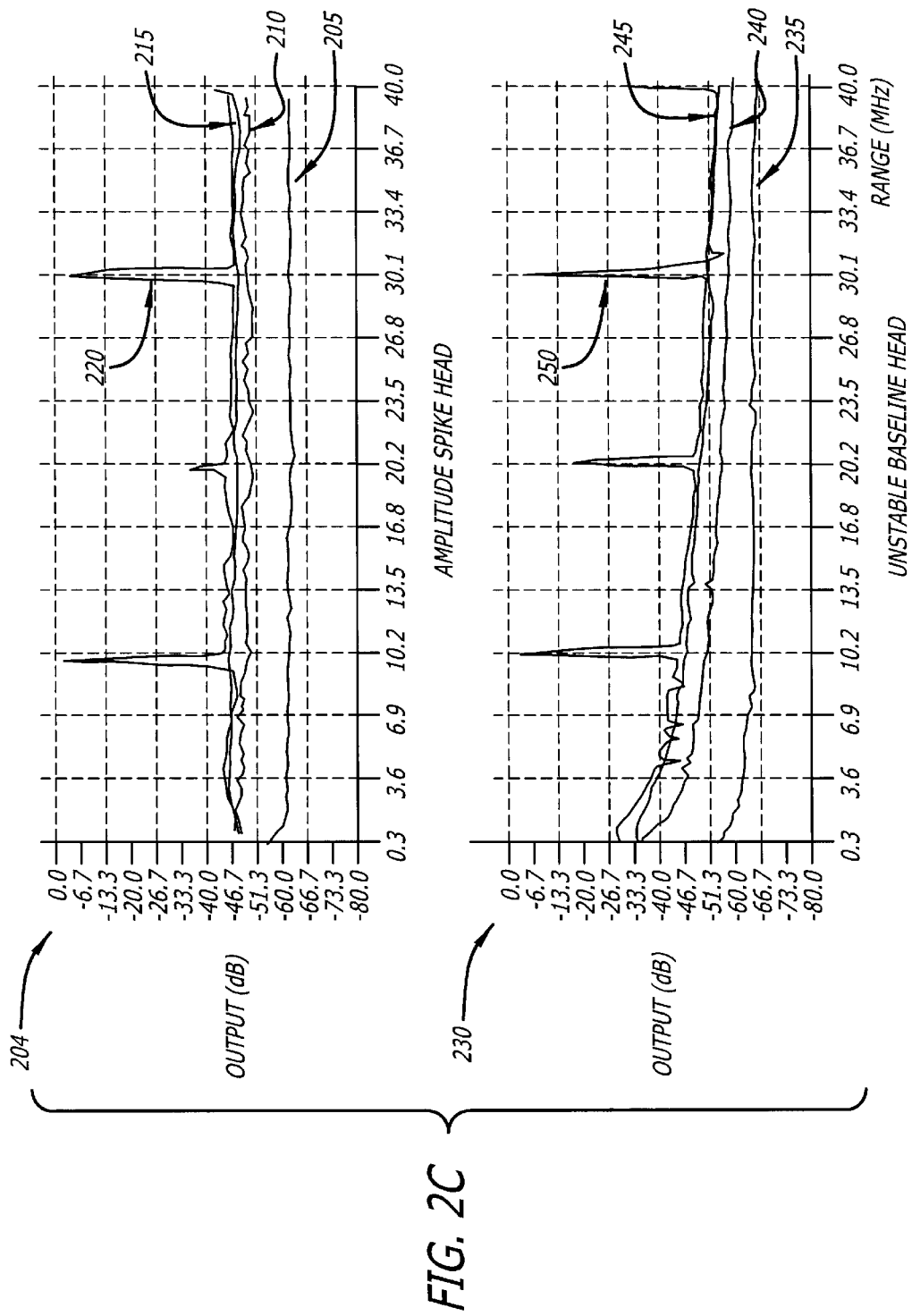
FIG. 2C depicts graphs of the frequency spectrums of heads exhibiting amplitude spike and unstable baseline defects, respectively.

FIG. 2A is a time-domain plot 200 in which y-axis is a measure of noise generated when a Test Head reads a recorded signal as a function of time. When the Test Head suffers from certain defects, such defects may manifest as random signal spikes, such as amplitude spikes A1 and A2. Similarly, FIG. 2B is a time-domain plot 202 in which head noise is again plotted as a function of time. In this case, the Test Head suffers from-a defect which is manifesting itself as an unstable baseline. The inventor further discloses using a spectrum analysis (using an spectrum analyzer such as RWA 165) in the frequency domain of the noise generated by a head at a given current to identify heads that have amplitude spike and/or unstable baseline defects. Referring in particular to FIG. 2C, graph 204 contains plots of popping noise (dB) versus frequency (MHz) for a Test Head having defects manifesting as amplitude spikes. As mentioned previously, amplitude spikes may be caused by different conditions, such as internal head design flaws. Thus, for convenience, a head exhibiting such characteristics will be referred to herein as a head having amplitude spike defects.

Referring still to graph 204, plot 205 represents the frequency spectrum where the Test Head reads a DC-erased track while being supplied with a current of 2.1 mA (the low base bias current). Similarly, plot 210 represents the frequency spectrum resulting from supplying the Test Head with a 5 mA and plot 215 is based on a 6 mA current (the high test bias current), both also reading a DC-erased track. In contrast, plot 220 represents the resulting frequency spectrum when the head reads a signal with a 6 mA current which was written at 10 MHz. It should further be appreciated that, as seen in graph 204, amplitude spike defects manifest as a large spectrum gap between the low base bias and high test bias curves for both low frequencies and high frequencies.

Referring now to graph 230, the various depicted plots were generated using the same currents as those in graph 204 (i.e., plot 235 used 2.1 mA, plot 240 used 5 mA, plot 245 used 6 mA, and plot 250 used 6 mA on a 10 MHz signal). While the plots of graph 230 also exhibit a large spectrum gap between the low base bias and high test bias plots, the spectrum gap is appreciably smaller at higher frequencies. Such a decreasing gap is exhibited by heads having defects manifesting as an unstable baseline. Again, for convenience, a head exhibiting such characteristics will be referred to herein as a head having unstable baseline defects.

Figure 2D:
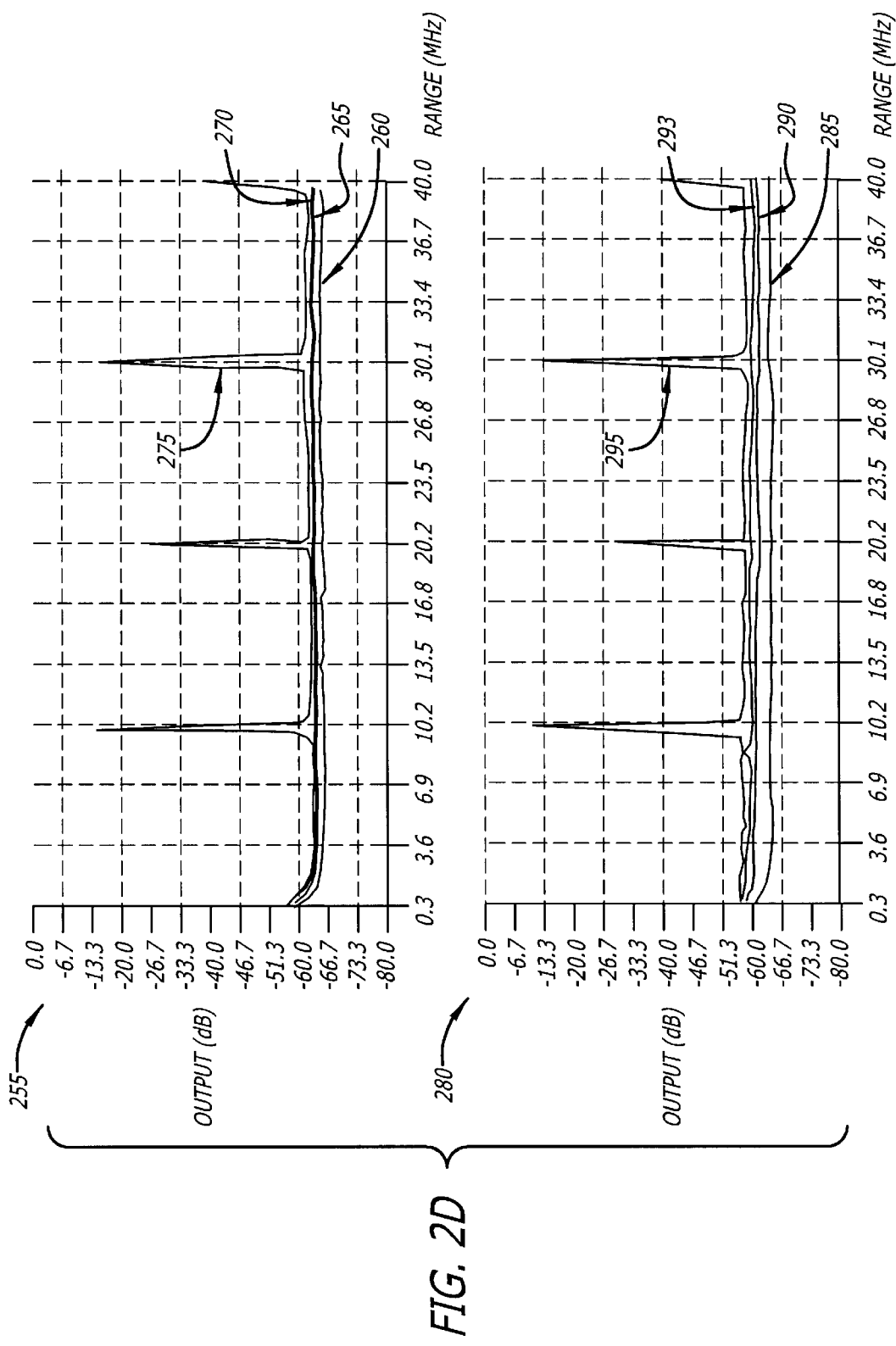
FIG. 2D depicts graphs of frequency spectrums of heads exhibiting acceptable popping noise characteristics.

FIG. 2D contains graphs of two non-defective heads. The individual plots of FIG. 2D were generated using the same current levels as used in FIG. 2C (i.e., 2.1 mA on a DC-erased track, 5 mA on a DC-erased track, 6 mA on a DC-erased track, and 6 mA on a 10 MHz signal).

Comparing FIG. 2C with 2D illustrates that the spectrum gap between the low base bias plots (205, 235, 260 and 285) and high test bias plots (215, 245, 270 and 293) is much smaller for the non-defective heads of FIG. 2D than for the defective heads of FIG. 2C. Thus, both amplitude spike and unstable baseline defects can be detected by comparing signal amplitude as a function of frequency over a plurality of currents. Moreover, a comparison of the frequency spectrum graphs of FIGS. 2C and 2D illustrates the fact that the delta between signal spikes in plot 220 is much greater than the delta for such spikes in plot 275.

It should further be appreciated that the unstable baseline defect seen in graph 230 is an unstable baseline defect not correlated to a signal. That being the case, a single-current defect test system, which compares the signal plot baseline against the DC-erased baseline, would not detect such a defect since the baselines for plots 245 and 250 are so similar. Thus, analyzing popping noise at the high test bias current and low base bias current, as in FIGS. 2C–2D, also enables detection of unstable baseline defects which are not correlated to a signal.

Figure 3:
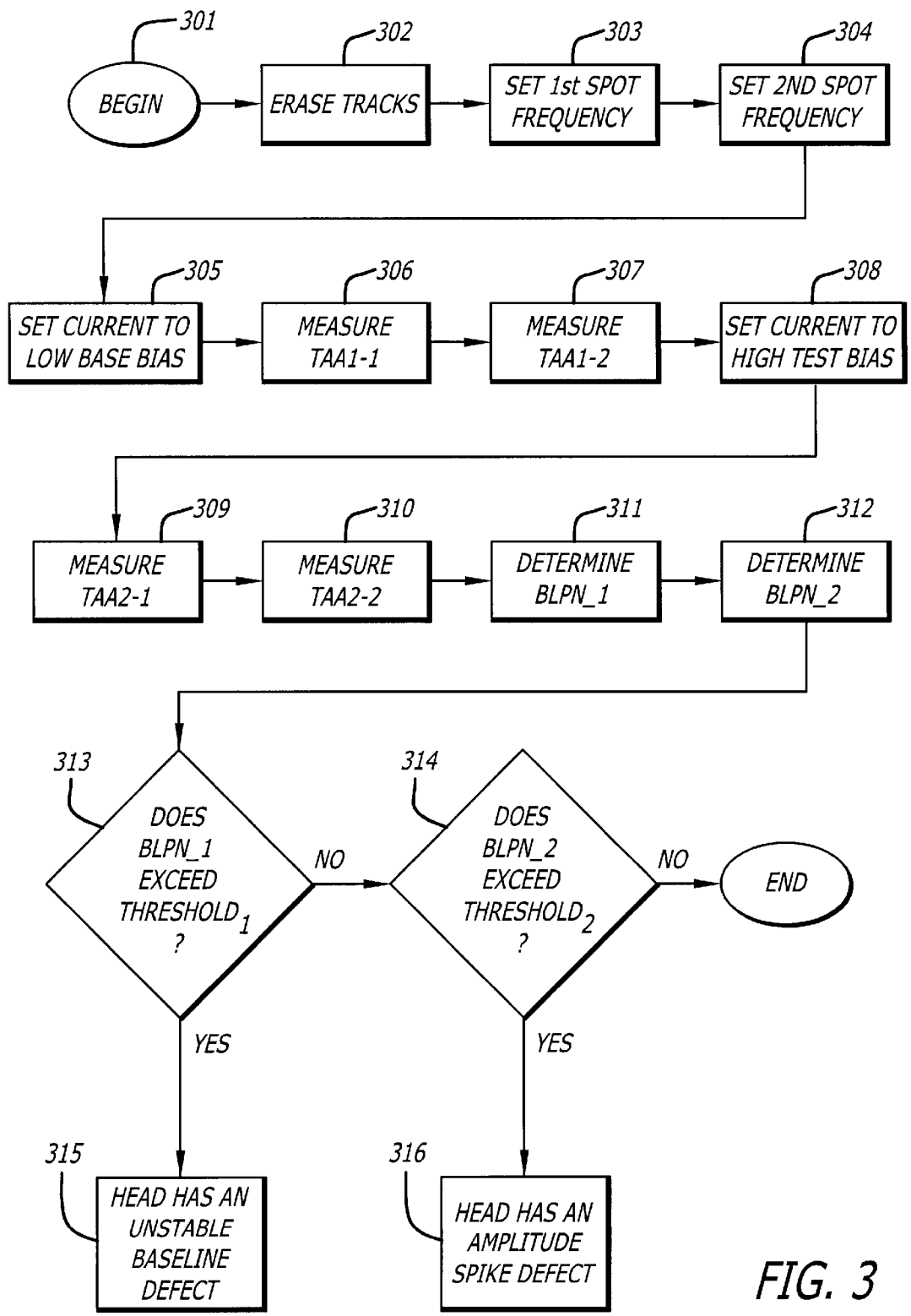
FIG. 3 is a flow diagram of a method for implementing one embodiment.

Referring now to FIG. 3, a block diagram of one embodiment is depicted. The process of FIG. 3 begins by DC-erasing at least one track on a disk (block 302) which is to be read by a Test Head (i.e., a GMR/MR head to be tested for defects). It should be appreciated that a plurality of tracks may similarly be DC-erased and used in the detection process. In one embodiment, the disk tracks to be erased may be erased using a GMR/MR head and spin stand 150.

At block 303, a First Spot Frequency is set. In one embodiment, the First Spot Frequency is between 1 and 10 megahertz. At block 304, a Second Spot Frequency is set which, in one embodiment, is between 20 and 40 megahertz. It should be appreciated that the desirable spot frequencies and spot frequency ranges may be different for different heads. Next, at block 305, the Low Base Bias current is set. The Low Base Bias is a relatively low current to be supplied to the Test Head. In one embodiment, the Low Base Bias is between 1 and 3 milliamps, though the Low Base Bias may be less than 1 mA or greater than 3 mA.

At block 306, the track average amplitude (TAA) is measured for a given track, or plurality of tracks. In particular, the value TAA1-1 represents the average noise amplitude at the First Spot Frequency generated by the Test Head when the Low Base Bias current is being supplied to the Test Head. The Test Head, which in one embodiment is connected to the spin stand 150, is directed to read a plurality of sample points along one of the DC-erased tracks on a disk. The TAA may then be computed by dividing the total signal amplitude by the number of sample points.

At block 307, the TAA at the second frequency is measured (TAA1-2) while the Low Base Bias current is supplied to the Test Head. Next, the current to be supplied to the Test Head is set to the High Test Bias (block 308). In one embodiment, the High Test Bias is between 3 and 7 milliamps, although it may be less than 3 milliamps or greater than 7 milliamps. At blocks 309 and 310, the TAA is measured at the First Spot Frequency (TAA2-1) and the Second Spot Frequency (TAA2-2), respectively, while the High Test Bias current is supplied to the Test Head.

At block 311, a first measure of popping noise is calculated (BLPN_1), which represents a quantification of the popping noise generated by the Test Head in question. In one embodiment, the following equation is used to compute BLPN_1:

$$\text{BLPN}\_1 = 20 * \log_{10}\left(\frac{TAA2-1}{TAA1-1}\right). \quad (1)$$

At block 312, a second measure of popping noise is calculated (BLPN_2), which represents a second measure of the popping noise generated by the Test Head. In one embodiment, BLPN_2 is computed as follows:

$$\text{BLPN}\_2 = 20 * \log_{10}\left(\frac{TAA2-2}{TAA1-2}\right). \quad (2)$$

At block decision 313, BLPN_1 is compared with a first reference threshold value (e.g., Threshold,). In one embodiment, this threshold value is 10 dB. In another embodiment, Threshold, is in the range of 7 to 15 dB. In yet another embodiment, Threshold, may be any other value. Where BLPN_1 exceeds Threshold, the head is identified as having an unstable baseline defect (block 315). Next, at decision block 314, BLPN_2 is compared with a second threshold value (e.g., Threshold$_2$). In one embodiment Threshold$_2$ is 8 dB, while in another embodiment Threshold$_2$ is between 6 and 10 dB. If BLPN_2 exceeds Threshold$_2$, the Test Head is identified as having an amplitude spike defect (block 316).

It should be appreciated that while equations (1) and (2) have the logarithm-portion of the equation being multiplied by the value of 20, this value may be any constant. Where the constant is something other than 20, the values for Threshold, and Threshold$_2$ may be correspondingly adjusted.

Figure 4A:
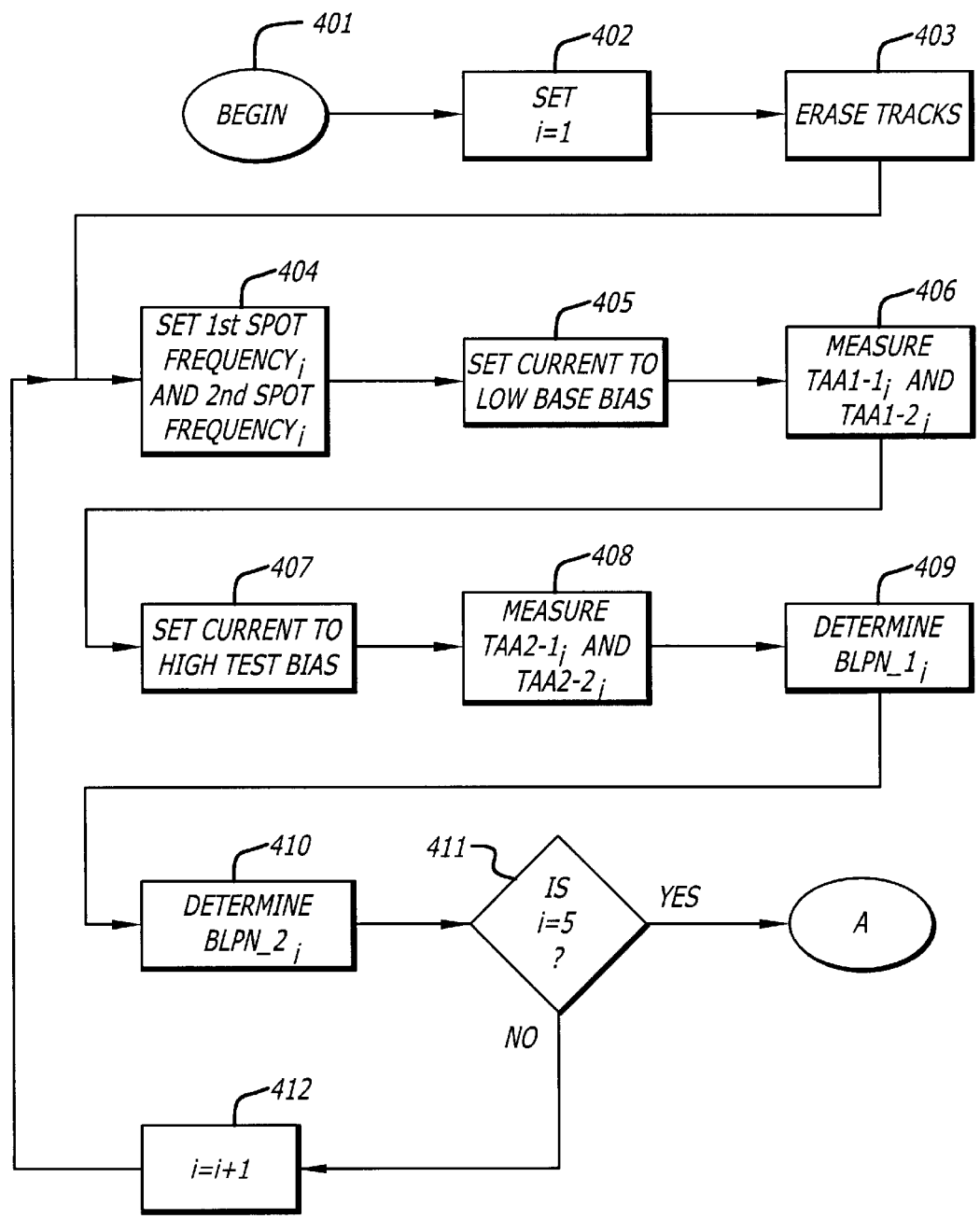
FIG. 4A is a flow diagram of another method for implementing one embodiment.
Figure 4B:
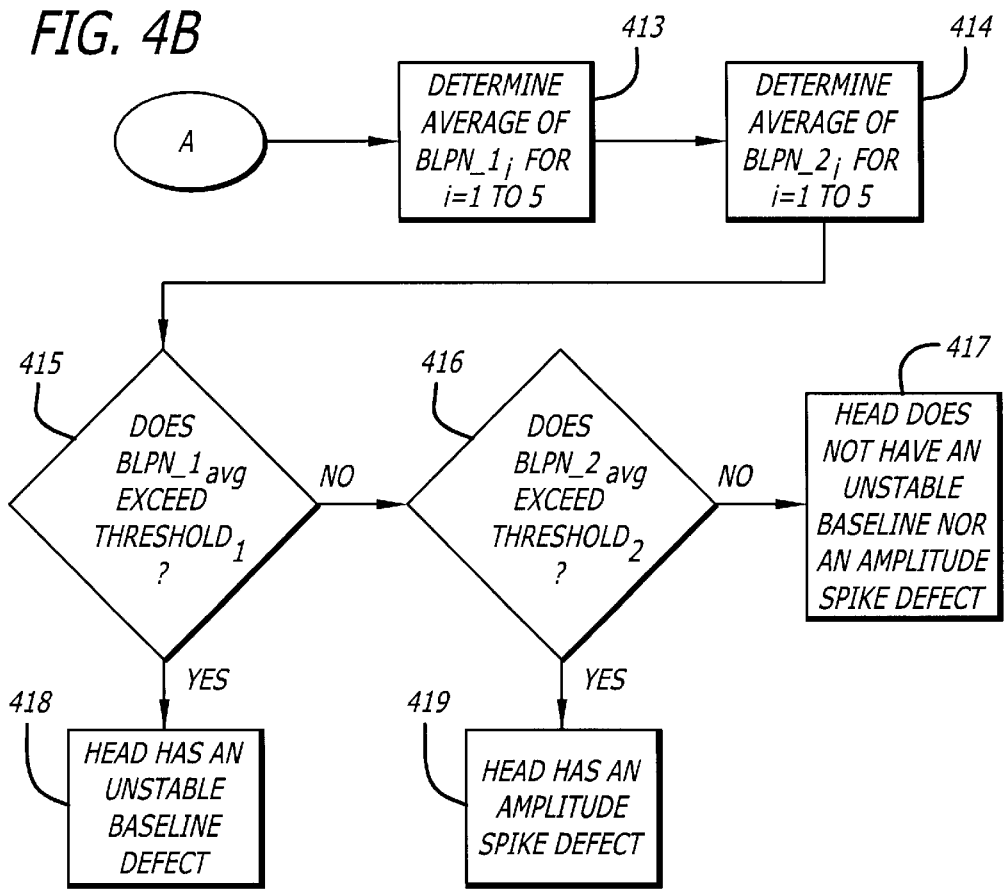
FIG. 4B is a continuation of the flow diagram of FIG. 4A depicting one embodiment of a method being disclosed by the inventor.

The flow diagrams of FIGS. 4A and 4B illustrate another embodiment. In this embodiment, an iteration variable is set to i=1 at block 402. As with the process of FIG. 3, at least one track to be read by the Test Head is DC-erased at block 403. The process through blocks 404–410 correlates to the process through respective blocks 303–312 discussed above. However, in the process of FIG. 4, the First Spot Frequency and Second Spot Frequency set at block 404 is set for the current iteration i, which in one embodiment is different for each iterations. In another embodiment the spot frequencies remain the same for each iteration.

The corresponding TAAs measured at blocks 406 and 408 relate to the present iteration i. Thus, for the first iteration, the TAAs measured at block 406 for the Low Base Bias with be TAA1-1$_1$ and TAA1-2$_1$ for the First Spot Frequency and the Second Spot Frequency, respectively. Similarly, the TAAs for the High Test Bias current would be TAA2-1$_1$ and TAA2-2$_1$.

At blocks 409 and 410, BLPN_1$_i$ and BLPN_2$_i$ are computed using equations (1) and (2), respectively. At decision block 411, a determination is made as to whether or not a predetermined number of iterations have been completed. In the illustrated embodiment, the number of iterations to be completed is 5. However, the predetermined number of iterations may be any number, depending on how many data points are desired.

After the first iteration, the process will increment i by 1 at block 412 and return to block 404 to obtain new TAA values to be stored as TAA1-1$_2$, TAA1-2$_2$, TAA2-1$_2$, and TAA2-2$_2$. From these values, BLPN_1$_2$ and BLPN_2$_2$ may then be calculated using equations (1) and (2).

Once all of the predetermined number of iterations have been completed, the process of FIG. 4A proceeds to the process of FIG. 4B. At blocks 413 and 414, the numerical averages for both BLPN_1$_i$ and BLPN_2$_i$ are computed using the value obtained for all completed iterations. It should be appreciated that other measures of amplitude may be used in place of the numerical average.

At block 415, the average for BLPN_1$_i$ (BLPN_1$_{avg}$) is compared to a threshold value for amplitude (Threshold,). In one embodiment, Threshold$_1$ is between 7 and 15 dB. If Threshold, is exceeded, then the Test Head is identified as having an unstable baseline defect at block 418. If, on the other hand, Threshold, is not exceeded, the process of FIG. 4B continues to decision block 416. At decision block 416 a determination is made as to whether the average amplitude for BLPN_2 (BLPN_2$_{avg}$) exceeds the a second threshold value (Threshold$_2$). In one embodiment, Threshold$_2$ is in the range of 6 to 10 dB. Where Threshold$_2$ is not exceeded, the Test Head is identified as not having an amplitude spike defect, nor an unstable baseline defect. Where Threshold$_2$ is exceeded at block 416, however, the Test Head is identified as having an amplitude spike defect at block 419.

Figure 5:
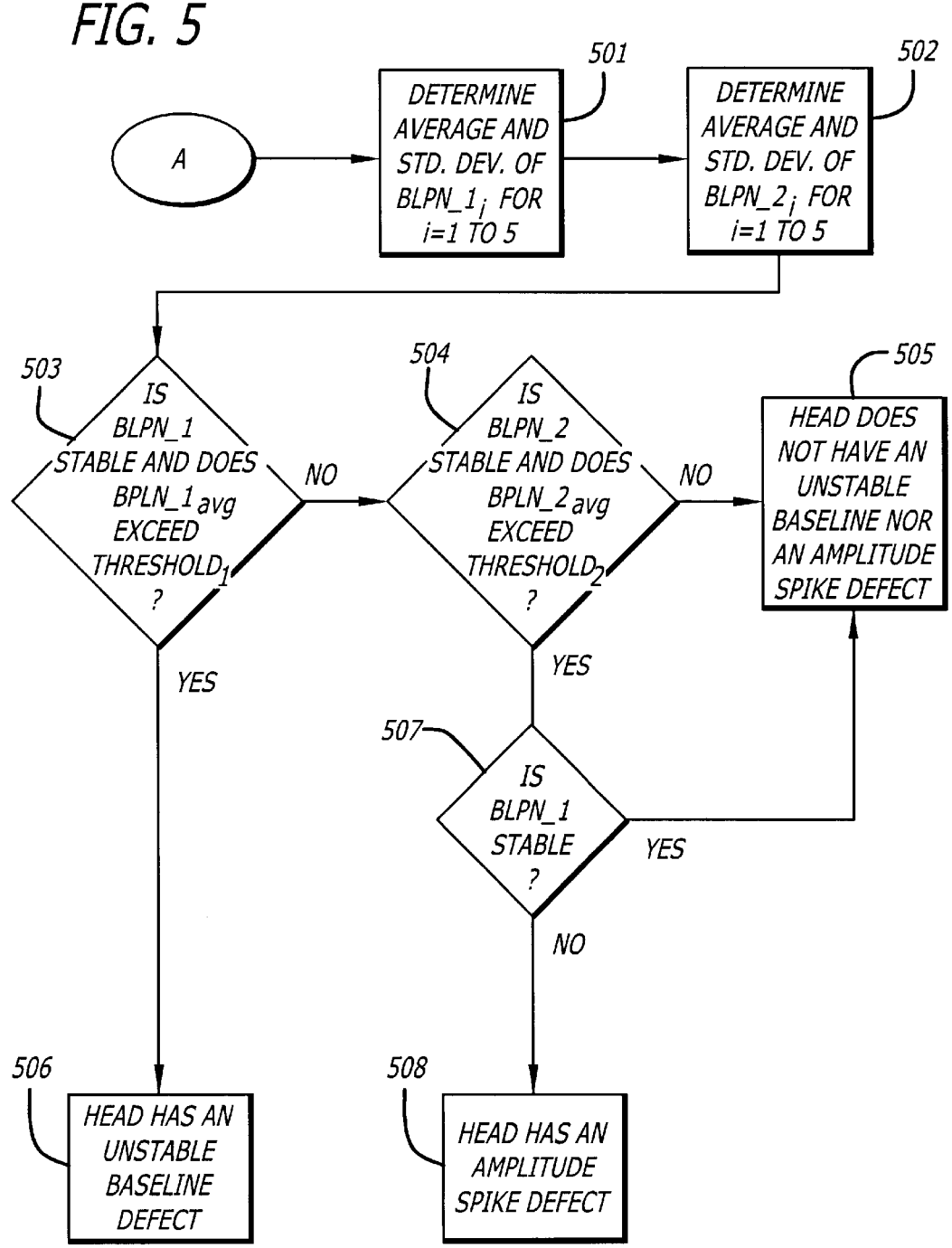
FIG. 5 is a continuation of the flow diagram of FIG. 4A depicting another embodiment of a method being disclosed by the inventor.

Yet another embodiment is described in FIGS. 5. The process of FIG. 5 begins where the process of FIG. 4B would have in the previously described embodiment. Thus, once block 411 determines that the predetermined number of iterations has been reached, the process, according to this embodiment, continues to block 501. In particular, at blocks 501 and 502 the numerical averages and standard deviations for both BLPN_$1_i$ and BLPN_$2_i$ are computed using the value obtained for all completed iterations. It should be appreciated that other measures of amplitude and stability may be used in place of the numerical averages and standard deviations. However, for simplicity, the measures of amplitude and stability for the TAAs will be described herein as being the averages and standard deviations, respectively.

At block 503, the average and standard deviation of BLPN_$1_i$ is compared to threshold values for amplitude and standard deviation. (Threshold, and $SD_1$). In one embodiment, Threshold, is between 7 and 15 dB, while $SD_1$ is between 0.65 and 1.0. If both Threshold$_1$ and $SD_1$ are exceeded, then the Test Head is identified as having an unstable baseline defect at block 506. If, on the other hand, Threshold, and $SD_1$ are not both exceeded, the process of FIG. 5 continues to decision block 504. At decision block 504 a determination is made as to whether the amplitude and the standard deviation for BLPN_2 exceed the corresponding threshold values (i.e., Threshold$_2$ and $SD_2$). In one embodiment, Threshold$_2$ is in the range of 6 to 10 dB, while $SD_2$ is between 0.65 and 1.0. Where both Threshold$_2$ and $SD_2$ are not exceeded, the Test Head is identified as not having an amplitude spike defect. Where both threshold value are exceeded at block 504, however, the process continues to block 507 where a determination is made as to whether the standard deviation for BLPN_1 exceeds $SD_1$. If so, then the Test Head is identified as having an amplitude spike defect at block 508. If, on the other hand, $SD_1$ is not exceeded then the Test Head is identified as not having an amplitude spike defect.

Figure 6:
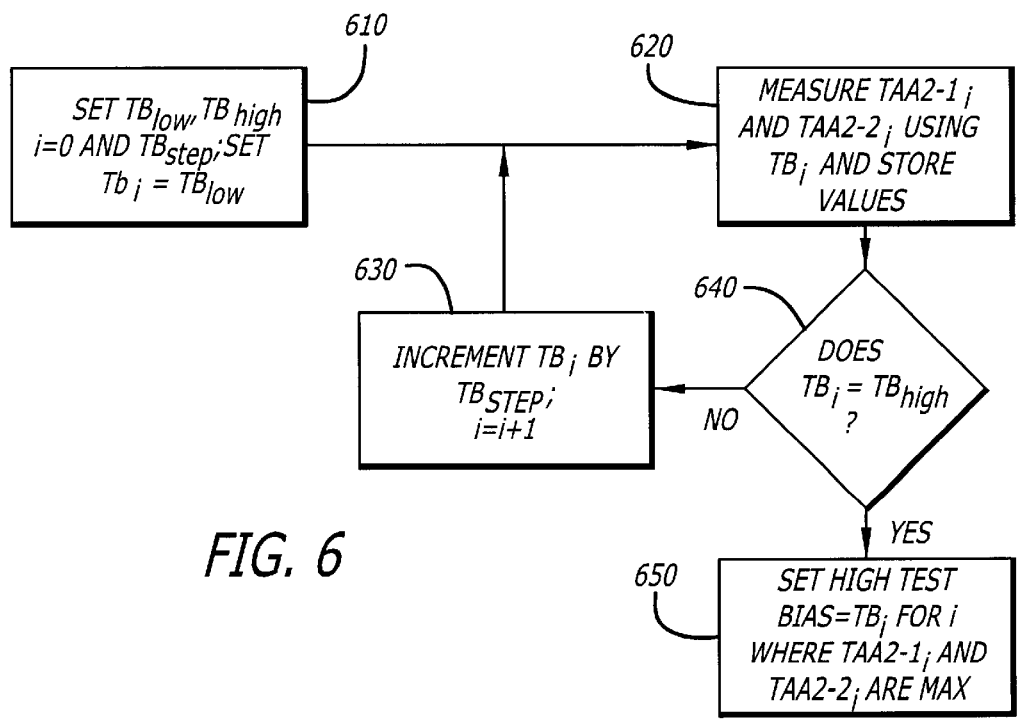
FIG. 6 is a flow diagram of another method disclosed by the inventor.

In yet another embodiment, rather than selecting a single High Test Bias current, an iterative process may be used to converge on the High Test Bias current which produces maximum values for TAA2-1 and TAA2-2. For example, FIG. 6 illustrates one embodiment which converges on the optimal test bias. At block 610, the outer points of a range of High Test Bias values is set (i.e., TB$_{low}$, and TB$_{high}$). Moreover, the size of the increment (TB$_{step}$) for each iteration is set, the counting variable i is to set to 0, and the initial test bias (TB$_i$) is set to TB$_{low}$.

As with processes of FIG. 3, the TAAs are measured for a First Spot Frequency and a Second Spot Frequency while providing the Test Head with a current of TB$_i$, yielding values for TAA2-$1_i$ and TAA2-$2_i$, respectively (block 620). These values are stored for later use. In one embodiment, these values are stored in a lookup table on computer 170. In another embodiment, these values are stored at RWA 165. In one embodiment, the First Spot Frequency is between 1 and 10 megahertz, while the Second Spot Frequency is between 20 and 40 megahertz.

At decision block 640, a determination is made as to whether the present test basis (TB$_i$) is equal to TB$_{high}$. If so, loop 620–640 ends and the process continues to block 650. If, on the other hand, TB$_i$ is still less than TB$_{high}$, then TB$_i$ is incremented by TB$_{step}$ and the counting variable i is incremented by 1. The loop continues, with the TAA values being stored as they are measured, until TB$_i$ equals TB$_{high}$.

At that point, the stored TAA values may be analyzed to determine the maximum values. In this manner, the TB$_i$ value which corresponds to the maximum TAA values may thereafter be used as the High Test Bias for the processes described in FIGS. 3–5.

The present invention may be implemented as a method, apparatus, system, computer program product, etc. When implemented in software, the elements of the present invention are essentially the code segments to perform the necessary tasks. The program or code segments can be stored in a processor readable medium, which includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for detecting defective heads comprising:
   a) erasing a track on a disk, said disk including a plurality of tracks;
   b) reading said track with a head;
   c) determining a first signal amplitude at a first frequency using a first current supplied to said head;
   d) determining a second signal amplitude at said first frequency using a second current supplied to said head;
   e) determining a first noise measure, said first noise measure to be a function of said first signal amplitude and said second signal amplitude; and,
   f) identifying said head as having a first defect type where said first noise measure is greater than a first amplitude threshold.

2. The method of claim 1 wherein c) comprises reading a noise level at each of a plurality of locations at said first frequency along the track on said disk and determining a numerical average of said noise levels, said noise levels to be read by said head using said first current.

3. The method of claim 1 wherein d) comprises reading a noise level at each of a plurality of locations at said first frequency along the track on said disk and determining a numerical average of said noise levels, said noise levels to be read by said head using said second current.

4. The method of claim 1 wherein c) comprises determining the first signal amplitude at the first frequency using the first current supplied to said head, said first frequency to be between 1 and 10 megahertz, said first current to be between 1 and 3 milliamps.

5. The method of claim 4 wherein d) comprises determining the second signal amplitude at the first frequency using the second current supplied to said head, said first frequency to be between 1 and 10 megahertz, said second current to be between 3 and 7 milliamps.

6. The method of claim 1 further comprising:
   g) determining a third signal amplitude at a second frequency using said first current supplied to said head;
   h) determining a fourth signal amplitude at said second frequency using said second current supplied to said head;
   i) determining a second noise measure, said second noise measure to be a function of the third signal amplitude and the fourth signal amplitude; and, j) identifying said head as having a second defect type where said second noise measure exceeds a second amplitude threshold.

7. The method of claim 6 wherein g) comprises reading a noise level at each of a plurality of locations at said second frequency along a track on said disk and determining a numerical average of said noise levels, said noise levels to be read by said head using the first current.

8. The method of claim 6 wherein h) comprises reading a noise level at each of a plurality of locations at said second frequency along a track on said disk and determining a numerical average of said noise levels, said noise levels to be read by said head using the second current.

9. The method of claim 6 wherein g) comprises determining the third signal amplitude at the second frequency using the first current supplied to said head, said second frequency to be between 20 and 40 megahertz, said first current to be between 1 and 3 milliamps.

10. The method of claim 6 wherein h) comprises determining the fourth signal amplitude at the second frequency using the second current supplied to said head, said second frequency to be between 20 and 40 megahertz, said second current to be between 3 and 7 milliamps.

11. The method of claim 6 wherein i) comprises multiplying a constant by a logarithm of a quotient, said quotient equal to the fourth signal amplitude divided by the third signal amplitude.

12. The method of claim 11 wherein i) comprises multiplying a constant by a logarithm of a quotient, said quotient equal to the fourth signal amplitude divided by the third signal amplitude, said constant equal to 20.

13. The method of claim 6 wherein j) comprises identifying said head as having an amplitude spike defect, said amplitude spike defect to manifest as a spectrum gap at both said first current and said second current, said spectrum gap to be substantially constant across said first current and said second current.

14. The method of claim 6 wherein j) comprises identifying said head as having the second defect type where said second noise measure exceeds the second amplitude threshold, said second amplitude threshold to be between 6 and 10 decibels.

15. The method of claim 1 wherein e) comprises multiplying a constant by a logarithm of a quotient, said quotient equal to the second signal amplitude divided by the first signal amplitude.

16. The method of claim 1 wherein f) comprises identifying said head as having an unstable baseline defect, said unstable baseline defect to manifest as a spectrum gap between said first current and second current where said spectrum gap is greater at said first current than at said second current.

17. The method of claim 1 wherein f) comprises identifying said head as having a first defect type where said first noise measure exceeds a first amplitude threshold, said first amplitude threshold to be between 7 and 15 decibels.

18. The method of claim 6 further comprising:
k) storing a value for said first noise measure and a value for said second noise measure;
l) repeating b) through e), g) through i), and k) a predetermined number of times;
m) determining a first average signal amplitude for said values from k) over said predetermined number of times;
n) identifying said head as having a first defect type where said first average signal amplitude exceeds a first amplitude threshold;
o) identifying said head as having a second defect type where said second average signal amplitude exceeds a second amplitude threshold.

19. The method of claim 18 wherein m) comprises determining the first average signal amplitude, said first average signal amplitude to be the numerical average of said values of the first noise measures from k) over the predetermined number of times from l).

20. The method of claim 18 wherein n) comprises identifying said head as having the first defect type where said first average signal amplitude exceeds a first amplitude threshold, said first amplitude threshold to be between 7 and 15 decibels.

21. The method of claim 18 wherein o) comprises identifying said head as having the second defect type where said second average signal amplitude exceeds a second amplitude threshold, said second amplitude threshold to be between 6 and 10 decibels.

22. An apparatus for detecting defective heads comprising:
a disk connected to a spin stand, said disk including a plurality of tracks;
a head coupled to said spin stand, said spin stand to cause said head to read from and write to said disk; and
a processor to control said spin stand, said processor to execute computer readable code to:
a) erase a track on the disk;
b) read said track with the head;
c) determine a first signal amplitude at a first frequency using a first current supplied to said head;
d) determine a second signal amplitude at said first frequency using a second current supplied to said head;
e) determine a first noise measure, said first noise measure to be a function of said first signal amplitude and said second signal amplitude; and,
f) identify said head as having a first defect type where said first noise measure is greater than a first amplitude threshold.

23. The apparatus of claim 22 wherein said first signal amplitude is determined by reading a noise level at each of a plurality of locations at said first frequency along the track on said disk and determine a numerical average of said noise levels, said noise levels to be read by said head using said first current.

24. The apparatus of claim 22 wherein said second signal amplitude is determined by reading a noise level at each of a plurality of locations at said first frequency along the track on said disk and determining a numerical average of said noise levels, said noise levels to be read by said head using said second current.

25. The apparatus of claim 22 wherein said first frequency is between 1 and 10 megahertz and said first current is between 1 and 3 milliamps.

26. The apparatus of claim 22 wherein said second current is between 3 and 7 milliamps.

27. The apparatus of claim 22 further comprising a processor to execute computer readable code to:
g) determine a third signal amplitude at a second frequency using said first current supplied to said head;
h) determine a fourth signal amplitude at said second frequency using said second current supplied to said head;
i) determine a second noise measure, said second noise measure to be a function of the third signal amplitude and the fourth signal amplitude; and, j) identify said head as having a second defect type where said second noise measure exceeds a second amplitude threshold.

28. The apparatus of claim 27 wherein said third signal amplitude is determined by reading a noise level at each of a plurality of locations at said second frequency along a track on said disk and determining a numerical average of said noise levels, said noise levels to be read by said head using the first current.

29. The apparatus of claim 27 wherein said fourth signal amplitude is determined by reading a noise level at each of a plurality of locations at said second frequency along a track on said disk and determining a numerical average of said noise levels, said noise levels to be read by said head using the second current.

30. The apparatus of claim 27 wherein said second frequency is between 20 and 40 megahertz and said first current is between 1 and 3 milliamps.

31. The apparatus of claim 30 wherein said second current is between 3 and 7 milliamps.

32. The apparatus of claim 27 wherein said second noise measure comprises multiplying a constant by a logarithm of a quotient, said quotient equal to the fourth signal amplitude divided by the third signal amplitude.

33. The apparatus of claim 27, wherein said constant is equal to 20.

34. The apparatus of claim 27, wherein said second defect type manifests as a spectrum gap at both said first current and second current, said spectrum gap to be substantially constant across said first current and said second current.

35. The apparatus of claim 27, wherein said second amplitude threshold is between 6 and 10 decibels.

36. The apparatus of claim 22, wherein said first noise measure is determined by multiplying a constant by a logarithm of a quotient, said quotient equal to the second signal amplitude divided by the first signal amplitude.

37. The apparatus of claim 22, wherein said first defect type manifests as a spectrum gap between said first current and second current where said spectrum gap is greater at said first current than at said second current.

38. The apparatus of claim 22, wherein said first amplitude threshold is between 7 and 15 decibels.

39. The apparatus of claim 27, further comprising a processor to execute computer readable code to:
  k) store a value for said first noise measure and a value for said second noise measure;
  l) repeat b) through e), g) through i) and k) a predetermined number of times;
  m) determine a first average signal amplitude for said values from k) over said predetermined number of times;
  n) identify said head as having a first defect type where said first average signal amplitude exceeds a first amplitude threshold; and,
  o) identify said head as having a second defect type where said second average signal amplitude exceeds a second amplitude threshold.

40. The apparatus of claim 27, further comprising a processor to execute computer readable code to:
  k) store a value for said first noise measure and a value for said second noise measure;
  l) repeat b) through e), g) through i), and k) a predetermined number of time;
  m) determine a first average signal amplitude and a first stability measure for said values from k) over said predetermined number of times;
  n) identify said head as having a first defect type where said first average signal amplitude exceeds a first amplitude threshold and said stability measure exceeds a first stability threshold; and,
  o) identify said head as having a second defect type where said second average signal amplitude exceeds a second amplitude threshold, said first stability measure exceeds said first stability threshold, and said second stability measure exceeds a second stability threshold.

41. The apparatus of claim 39 wherein said first average signal amplitude is the numerical average of said values of the first noise measures from k) over the predetermined number of times from l).

42. The apparatus of claim 40 wherein said first average signal amplitude is the numerical average of said values of the first noise measures from k) over the predetermined number of times from l), and the first stability measure is the standard deviation of the first noise measure from k) over the predetermined number of times from l).

43. The apparatus of claim 39 wherein, said first signal amplitude is between 7 and 15 decibels.

44. The apparatus of claim 39, wherein said second amplitude threshold is between 6 and 10 decibels.

45. The apparatus of claim 40 wherein said first stability threshold and said second stability threshold are between 0.65 and 1.0.

46. The apparatus of claim 27, wherein said second current is a current within a predetermined range of currents at which said second signal amplitude and said fourth signal amplitude are maximized for said predetermined range.

47. A computer usable medium having computer readable program code embodied therein to detect defective heads, the computer readable program code in said computer program product to:
  a) erase a track on a disk, said disk to include a plurality of tracks;
  b) read a track on said disk with a head;
  c) determine a first signal amplitude at a first frequency using a first current supplied to said head;
  d) determine a second signal amplitude at said first frequency using a second current supplied to said head;
  e) determine a first noise measure, said first noise measure to be a function of said first signal amplitude and said second signal amplitude;
  f) identify said head as having a first defect type where said first noise measure is greater than a first threshold value;
  g) determine a third signal amplitude at a second frequency using said first current supplied to said head;
  h) determine a fourth signal amplitude at said second frequency using said second current supplied to said head;
  i) determine a second noise measure, said second noise measure to be a function of the third signal amplitude and the fourth signal amplitude; and,
  j) identify said head as having a second defect type where said second noise measure exceeds a second amplitude threshold.

48. An apparatus for detecting defective heads comprising:
  a) means for erasing a track on a disk, said disk including a plurality of tracks;
  b) means for reading said track with a head;
  c) means for determining a first signal amplitude at a first frequency using a first current supplied to said head;

d) means for determining a second signal amplitude at said first frequency using a second current supplied to said head;

e) means for determining a first noise measure, said first noise measure to be a function of said first signal amplitude and said second signal amplitude; and, f) means for identifying said head as having a first defect type where said first noise measure is greater than a first amplitude threshold.

49. The apparatus of claim 48 wherein c) comprises means for reading a noise level at each of a plurality of locations at said first frequency along the track on said disk and determining a numerical average of said noise levels, said noise levels to be read by said head using said first current.

50. The apparatus of claim 48 wherein d) comprises means for reading a noise level at each of a plurality of locations at said first frequency along the track on said disk and determining a numerical average of said noise levels, said noise levels to be read by said head using said second current.

51. The apparatus of claim 48 wherein c) comprises means for determining the first signal amplitude at the first frequency using the first current supplied to said head, said first frequency to be between 1 and 10 megahertz, said first current to be between 1 and 3 milliamps.

52. The apparatus of claim 51 wherein d) comprises means for determining the second signal amplitude at the first frequency using the second current supplied to said head, said first frequency to be between 1 and 10 megahertz, said second current to be between 3 and 7 milliamps.

53. The apparatus of claim 48 further comprising:

g) means for determining a third signal amplitude at a second frequency using said first current supplied to said head;

h) means for determining a fourth signal amplitude at said second frequency using said second current supplied to said head;

i) means for determining a second noise measure, said second noise measure to be a function of the third signal amplitude and the fourth signal amplitude; and, j) means for identifying said head as having a second defect type where said second noise measure exceeds a second amplitude threshold.

54. The apparatus of claim 53 wherein g) comprises means for reading a noise level at each of a plurality of locations at said second frequency along a track on said disk and determining a numerical average of said noise levels, said noise levels to be read by said head using the first current.

55. The apparatus of claim 53 wherein h) comprises means for reading a noise level at each of a plurality of locations at said second frequency along a track on said disk and determining a numerical average of said noise levels, said noise levels to be read by said head using the second current.

56. The apparatus of claim 53 wherein g) comprises means for determining the third signal amplitude at the second frequency using the first current supplied to said head, said second frequency to be between 20 and 40 megahertz, said first current to be between 1 and 3 milliamps.

57. The apparatus of claim 53 wherein h) comprises means for determining the fourth signal amplitude at the second frequency using the second current supplied to said head, said second frequency to be between 20 and 40 megahertz, said second current to be between 3 and 7 milliamps.

58. The apparatus of claim 53 wherein i) comprises multiplying a constant by a logarithm of a quotient, said quotient equal to the fourth signal amplitude divided by the third signal amplitude.

59. The apparatus of claim 53 wherein j) comprises means for identifying said head as having an amplitude spike defect, said amplitude spike defect to manifest as a spectrum gap at both said first current and said second current, said spectrum gap to be substantially constant across said first current and said second current.

60. The apparatus of claim 53 wherein j) comprises means for identifying said head as having the second defect type where said second noise measure exceeds the second amplitude threshold, said second amplitude threshold to be between 6 and 10 decibels.

61. The apparatus of claim 48 wherein e) comprises multiplying a constant by a logarithm of a quotient, said quotient equal to the second signal amplitude divided by the first signal amplitude.

62. The apparatus of claim 48 wherein f) comprises means for identifying said head as having an unstable baseline defect, said unstable baseline defect to manifest as a spectrum gap between said first current and second current where said spectrum gap is greater at said first current than at said second current.

63. The apparatus of claim 48 wherein f) comprises means for identifying said head as having a first defect type where said first noise measure exceeds a first amplitude threshold, said first amplitude threshold to be between 7 and 15 decibels.

64. The apparatus of claim 53 further comprising:

p) means for storing a value for said first noise measure and a value for said second noise measure;

q) means for repeating b) through e), g) through i), and k) a predetermined number of times;

r) means for determining a first average signal amplitude for said values from k) over said predetermined number of times;

s) means for identifying said head as having a first defect type where said first average signal amplitude exceeds a first amplitude threshold;

t) means for identifying said head as having a second defect type where said second average signal amplitude exceeds a second amplitude threshold.

* * * * *